United States Patent [19]

Codiglia

[11] Patent Number: 5,304,311
[45] Date of Patent: Apr. 19, 1994

[54] METHOD FOR REMOVING HYDROCARBON PRODUCTS FROM THE SURFACE OF AN AQUEOUS MEDIUM

[75] Inventor: Stelio Codiglia, Ferrara, Italy

[73] Assignee: Enichem Elastomeri S.r.L., Milan, Italy

[21] Appl. No.: 906,739

[22] Filed: Jun. 30, 1992

[30] Foreign Application Priority Data

Jul. 4, 1991 [IT] Italy .................. MI 91 A/001856

[51] Int. Cl.$^5$ .................. C02F 1/28; C02F 1/40; B01D 15/00
[52] U.S. Cl. .................. 210/693; 210/924; 210/641; 210/692; 210/747
[58] Field of Search ......... 210/690, 691, 692, 693, 210/922, 924, 925, 680, 799, 242.4, 747, 170, 923; 134/7; 405/60

[56] References Cited

U.S. PATENT DOCUMENTS

| | | |
|---|---|---|
| 3,146,192 | 8/1964 | McClintock . |
| 3,198,731 | 8/1965 | De Lew .................. 210/774 |
| 3,265,616 | 8/1966 | Wyllie et al. . |
| 3,415,745 | 12/1968 | Isaacson .................. 210/925 |
| 3,567,660 | 3/1971 | Winkler .................. 210/680 |
| 3,657,125 | 4/1972 | Strickman .................. 210/693 |
| 3,888,766 | 6/1975 | De Young .................. 210/693 |
| 3,929,631 | 12/1975 | Winkler .................. 210/693 |
| 4,039,489 | 8/1977 | Fletcher et al. .................. 210/693 |
| 4,102,783 | 7/1978 | Zenno et al. .................. 210/693 |
| 4,420,400 | 12/1983 | Weitzen .................. 210/925 |
| 4,497,663 | 2/1985 | Fisher et al. .................. 210/925 |
| 4,801,386 | 1/1989 | Sugimori et al. .................. 210/693 |
| 4,941,978 | 7/1990 | Gabrick . |

FOREIGN PATENT DOCUMENTS

| | | |
|---|---|---|
| 2251610 | 10/1972 | Fed. Rep. of Germany . |
| 2339541 | 2/1975 | Fed. Rep. of Germany . |
| 2621961 | 4/1977 | Fed. Rep. of Germany . |
| 1417960 | 12/1975 | United Kingdom . |

*Primary Examiner*—Cynthia L. Nessler
*Attorney, Agent, or Firm*—Shea & Gould

[57] ABSTRACT

Method for removing hydrocarbon products from the surface of an aqueous medium, in particular from the surface of water masses, such as sea, rivers, lakes, ponds, basins, and so forth, which consists in bringing said hydrocarbon products into contact with an elastomeric material in subdivided form, essentially constituted by an ethylene/alpha-olefin copolymer, optionally containing a diene as a termonomer. The elastomeric material absorbs the hydrocarbons, with a jelly mass being formed which is homogeneous and not very sticky, and floats on water surface and can be easily collected by means of conventional mechanical means.

12 Claims, No Drawings

METHOD FOR REMOVING HYDROCARBON PRODUCTS FROM THE SURFACE OF AN AQUEOUS MEDIUM

The present invention relates to a method for removing hydrocarbon products from the surface of an aqueous medium, in particular from the surface of water masses, such as sea, rivers, lakes, ponds, and so forth.

The urging demand for petroleum products by industrialized countries made it necessary extremely large amounts of petroleum and derivatives thereof to be freighted by sea. The adoption of effective safety measures, although made it possible the risks of environmental pollution to be reduced, unfortunately does not exclude that dispersions into sea of more or less considerable amounts of petroleum products may accidentally occur. These may cause damages to the environment, which may even be very serious, because the hydrocarbon substances, lighter than water, tend to spread over wide surface-areas, forming on same water surface a layer which prevents the oxygen exchanges with atmosphere, with consequent damages to marine life. Furthermore, the pollution may also strike coasts, causing serious damages both to ecological equilibrium of beaches, and to the human activities which take place along coasts (it will be enough to think of harbour traffics and tourism).

The removal of hydrocarbon products dispersed into water involves considerable difficulties, mainly linked to the matter of fact that more volatile constituents evaporate, whilst the heavier fractions tend to form with water a very viscous and sticky emulsion, difficultly recovered by means of conventional methods.

In order to solve such a problem, the use was suggested of various kinds of absorbent materials which, when brought into contact with liquid hydrocarbons, are capable of absorbing them and then can be easily recovered.

The main characteristics which render an absorbent material suitable for such a type of use are the following:

high affinity with hydrocarbons, and consequently high absorbing effectiveness, expressed as amount of oil substance absorbed per unit weight of absorbent material;

high surface area of the material, so as to favour the contact thereof with the polluting product, and consequently increase the absorbing effectiveness;

low specific gravity, such as to secure that the material will float on water surface both before and after the impregnation thereof with the oil substances;

low stickiness and good consistency of the material once that the later has absorbed the oil product, so as to favour the recovery thereof;

low cost of the absorbent material, so as to secure the cheapness of the method;

possibility of recycling the material after use, or of re-using the hydrocarbon-impregnated material for other purposes, so as to prevent problems for disposal of recovered product.

In DE-2,845,975 patent the use is disclosed of perlite and/or vermiculite granules swollen and treated with silicones, paraffinic hydrocarbons and soaps in order to increase their resistance to pulverization and decrease their specific gravity.

In UK patent 1,417,960, the use is disclosed of cellulose fibres impregnated with a hydrofobic substance.

For removing petroleum and petroleum derivatives from the surface of water masses, the use of styrene rubbers is known as well. In particular, in U.S. Pat. No. 3,265,616, a latex of a styrene-butadiene rubber is disclosed, and in U.S. Pat. No. 4,941,978 a styrene-ethylene/butylene block copolymer in granular form is used.

One from the main drawbacks displayed by the absorbent materials disclosed in the art, which renders them not very suitable for the intended purpose, is their limited affinity with hydrocarbons and therefore their poor absorbing effectiveness. It derives from the above that in order to obtain a complete removal of polluting products, large amounts of absorbent material have to be used. Furthermore, as regards styrene elastomers, it results it difficult to obtain them in a subdivided form with such characteristics as to secure an effective contact thereof with the hydrocarbon product.

The present Applicant has found now that the above drawbacks can obviated by using, as the absorbent material, an elastomeric ethylene/alpha-olefin copolymer, optionally copolymerized with a diene, in a subdivided form. Such a material, characterized by a high absorbing effectiveness and a low specific gravity, after absorbing the hydrocarbon product, forms a jelly, homogeneous and not very sticky mass, which floats on water surface and therefore can be easily removed by means of conventional mechanical means.

Therefore, the object of the present invention is a method for removing hydrocarbon products from the surface of an aqueous medium, which method consists in:

(a) bringing said hydrocarbon products into contact with an elastomeric material in subdivided form, essentially constituted by an ethylene/alpha-olefin copolymer, optionally containing a diene as a termonomer, with a weight ratio of elastomeric material:-hydrocarbon product comprised within the range of from 1:1 to 1:25;

(b) allowing said elastomeric material to absorb the hydrocarbon products, with a jelly mass being formed which is homogeneous and not very sticky, and floats on water surface; and (c) collecting said jelly mass, and removing it from said aqueous medium, by means of conventional mechanical means.

The elastomeric materials which are advantageously useable in the method according to the present invention comprise the copolymers of ethylene and a straight-chain alpha-olefin of from 3 to 10 carbon atoms, characterized by a Mooney viscosity comprised within the range of from 20 to 150 ML(1+4) at 100° C. and a specific gravity comprised within the range of from 0,860 to 0,900 g/cm$^3$. The weight ratio of ethylene to alpha-olefin is generally comprised within the range of from 10:90 to 90:10, preferably of from 20:80 to 40:60.

Particularly preferred are ethylene/propylene copolymers, possibly containing, as a termonomer, an either conjugated or non-conjugated diene, of either cyclic or acyclic type. Commonly used dienes for such a purpose are, for example: 5-ethylidene-2-norbornene, dicyclopentadiene, 1,4-hexadiene, vinyl-norbornene, 1,3-butadiene, and so forth. The diene content is generally comprised within the range of from 1 to 20% by weight, and preferably of from 2 to 6% by weight, of dienic monomeric units in said terpolymer.

In order to increase the contact surface-area between the absorbent material and the hydrocarbon product, the elastomer is used in a subdivided form, for example as a powder consisting of particles with a diameter comprised within the range of from about 0.1 to about 3.0 mm, or as expanded granules with a diameter comprised within the range of from about 2 to about 10 mm. For that purpose, those expanded granules can be used advantageously, which are directly obtained from the finishing lines of ethylene rubber production facilities. The expanding of the granules is caused by the pressure and temperature gradients the elastomeric material undergoes as it leaves the extruder/dryer.

As already said hereinabove, the considerably high affinity between the elastomeric material and the hydrocarbon product determines a high absorption effectiveness and consequently makes it possible low ratios by weight of elastomeric material to polluting product to be used, i.e. comprised within the range of from 1:1 to 1:25, preferably of from 1:5 to 1:20.

The elastomeric material, both dry and already wetted, can be distributed on the water surface polluted by the hydrocarbons, with any means suitable for securing an as uniform as possible distribution; the selection will depend of course on the extension of the area to be reclaimed. In order to achieve the highest effectiveness, the treatment should advisably be carried out before that solid, bituminous agglomerates are formed, whose absorption would result to be more difficult than of hydrocarbons in the liquid state.

The absorption of hydrocarbon products by the elastomeric material is rapid and generally is complete within time periods shorter than 1 hour, when the absorbing material is in powder form; and within 12-24 hours when said elastomeric material is in granular form. The absorption may be favoured by slight stirring, which anyway does not constitute an essential condition for a satisfactory end result to be reached.

Once that it has absorbed the hydrocarbon products, the elastomeric material turns into a jelly, homogeneous and not very sticky mass, which can be easily collected by means of normal floating barriers, and recovered with conventional mechanical means.

According to a different form of practical embodiment of the present invention, instead of being freely dispersed in water, the elastomeric material can be enclosed inside a tubular container made from a net material, constituted, e.g., by fibres of polypropylene or another thermoplastic material. In that way, with a suitable ballast, floating barriers can be formed which are endowed with a high absorbing power, and may be advantageously used in all those situations in which it is necessary to prevent accidentally dispersed petroleum products (e.g., owing to accident or during tankers loading and discharging operations) from throughout dispersed the whole water surface.

The following examples of practical embodiment are supplied in order to better illustrate the present invention, and in no way shall be construed as being limitative of the purview of the same invention.

EXAMPLE 1

A metal drum of approximately 100 liters of capacity was charged with 50 liters of water, 8 kg of transportation gasoil and 2 kg of heavy fuel oil. On the layer of hydrocarbons which formed on water surface, 1 kg of elastomeric material Dutral ® Ter 038/FF in form of expanded granules of approximately 5-8 mm of diameter was spread. This is a commercial product, which is constituted by an ethylene/propylene/ethylidene-norbornene terpolymer (ENB) in a weight ratio of 68.5/27/4.5 respectively, having a specific gravity of 0.865 g/cm$^3$ and Mooney viscosity of 60 ML(1+4) at 125° C. Approximately 24 hours later, all hydrocarbon liquid was absorbed by the elastomer, with a jelly mass with good consistency and not very sticky, easily removable, being formed. The underlying water results to be practically free from hydrocarbon residues.

EXAMPLES 2-8

The absorbing effectiveness was verified of several types of Dutral ® rubbers, the characteristics of which are reported in Table I. The results obtained are reported in Table II.

The tests were carried out inside a glass container of 600 ml of capacity, at room temperature, and without stirring.

When absorbent products in powder form are used, after a few minutes a jelly mass with a medium-low viscosity, and not very sticky is formed, which is homogeneous and sharply separated from the underline water phase.

When the absorbent material is in granular form, a complete absorption is obtained after about 12-24 hours. In both cases, the jelly layer can be easily collected and removed, leaving the aqueous phase practically free from residues.

TABLE I

| | Polymer | | | |
|---|---|---|---|---|
| | A | B | C | D |
| Commercial designation | Dutral CO034/POL | Dutral CO038/POL | Dutral TER038/FF | Dutral CO-TER(*) |
| Mooney viscosity | | | | |
| at 100° C. | 42 | — | — | — |
| at 125° C. | — | 60 | 60 | — |
| Specific gravity (g/cm$^3$) | 0.865 | 0.865 | 0.865 | 0.865 |
| Propylene content (% by weight) | 28 | 28 | 27 | — |
| ENB content (% by weight) | 0 | 0 | 4.5 | — |
| Physical form | powder (0.1-3 mm) | powder (0.1-3 mm) | expanded granules | granules (0.5-8 mm) |

(*)This is a waste material, with irregular granulometry and constituted by a mixture of copolymer and terpolymer, recovered from the finishing lines and from the strippers during the production of ethylenic elastomers.

TABLE II

| | Example | | | | | | |
|---|---|---|---|---|---|---|---|
| | 2 | 3 | 4 | 5 | 6 | 7 | 8 |
| Polymer type | C | C | A | A | B | B | D |
| Water (g) | 200 | 200 | 200 | 200 | 200 | 200 | 200 |
| Gas oil (g) | 100 | 150 | 150 | 200 | 150 | 200 | 150 |
| Polymer (g) | 10 | 10 | 10 | 10 | 10 | 10 | 10 |
| Ratio of polymer:gas oil, by weight | 1:10 | 1:15 | 1:15 | 1:20 | 1:15 | 1:20 | 1:15 |

TABLE II-continued

| | Example | | | | | | |
|---|---|---|---|---|---|---|---|
| | 2 | 3 | 4 | 5 | 6 | 7 | 8 |
| Absorption time | about 12 hrs | about 24 hrs | 15 min | about 12 hrs | 15 min | about 12 hrs | about 24 hrs |

I claim:

1. A method for removing hydrocarbon products from the surface of an aqueous medium, comprising the steps of:
   (a) absorbing the hydrocarbon products using the steps consisting of:
      (i) bringing the hydrocarbon products into contact with a solid, sub-divided ethylene/alpha olefin copolymer elastomeric material or a solid, sub-divided ethylene/alpha olefin/diene terpolymer elastomeric material and (ii) allowing the elastomeric material to absorb the hydrocarbon products and form a layer of a homogeneous jelly-like mass on the surface of the aqueous medium, the jelly-like mass consisting of the elastomeric material containing the absorbed hydrocarbon products;
   (b) mechanically removing the jelly-like mass from the surface of the aqueous medium.

2. The method of claim 1, wherein the weight ratio between the ethylene and the alpha-olefin in the elastomeric material ranges from 20:80 to 40:60.

3. The method of claim 1, wherein the alpha-olefin is a straight-chain alpha-olefin containing from 3 to 10 carbon atoms.

4. The method of claim 1, wherein the alpha-olefin is propylene.

5. The method of claim 1, wherein the ethylene/alpha-olefin copolymer has a Mooney viscosity ranging from 20 to 150 ML(1+4) at 100° C. and a specific gravity ranging from 0.860 $g/cm^3$ to 0.900 $cm^3$.

6. The method of claim 1, wherein the solid, sub-divided elastomeric material is in the form of a powder and the powder contains particles ranging in diameter from 0.1 mm to 3.0 mm.

7. The method of claim 1, wherein the solid, sub-divided elastomeric material is in the form of expanded granules and the expanded granules have diameters from 2 mm to 10 mm.

8. The method of claim 1, wherein the weight ratio between the elastomeric material and the hydrocarbon products is within the range of from 1:1 to 1:25.

9. The method of claim 1, wherein the diene in the ethylene/alpha-olefin/diene terpolymer is a conjugated diene.

10. The method of claim 1, wherein the diene in the ethylene/alpha-olefin/diene terpolymer is a non-conjugated diene.

11. The method of claim 9, wherein the amount of diene present in the ethylene/alpha-olefin/diene terpolymer ranges from 1 to 20% by weight.

12. The method of claim 10, wherein the amount of diene present in the ethylene/alpha-olefin/diene terpolymer ranges from 1 to 20% by weight.

* * * * *